United States Patent [19]
Claus et al.

[11] 3,935,951
[45] Feb. 3, 1976

[54] APPARATUS FOR PULLING AND REPLACING HEAT EXCHANGE TUBING

[76] Inventors: Ulrich Claus, Kolner Str. 128, 5908 Neunkirchen; Dieter Dischmann, Erlenstrasse, 5908 Neunkirchen-Struthutten, both of Germany

[22] Filed: July 26, 1974

[21] Appl. No.: 492,977

[52] U.S. Cl. ............ 214/1 P; 29/202 R; 214/16.4 R
[51] Int. Cl.² .......................................... B66F 1/00
[58] Field of Search .............. 214/1 P, 16.4 R, 658; 294/86 LS; 29/202 R

[56] References Cited
UNITED STATES PATENTS

| | | | |
|---|---|---|---|
| 3,126,103 | 3/1964 | Postlewaite | 214/1 P |
| 3,567,044 | 3/1971 | Travis | 214/1 P |

*Primary Examiner*—Robert J. Spar
*Assistant Examiner*—George F. Abraham
*Attorney, Agent, or Firm*—Young & Thompson

[57] ABSTRACT

Tube bundles of heat exchangers are pulled and replaced by an apparatus that butts against the shell of the heat exchanger and draws out the tube bundles lengthwise. The device may be moved by a crane, and for this purpose has a single suspension point which can be moved lengthwise according to the altered position of the center of gravity depending on whether a tube bundle is supported thereon. A fixed support with a vertically movable cradle is provided adjacent the heat exchange casing and a horizontally movable support with a vertically movable cradle is provided remote from the casing, for supporting the tube bundle.

3 Claims, 7 Drawing Figures

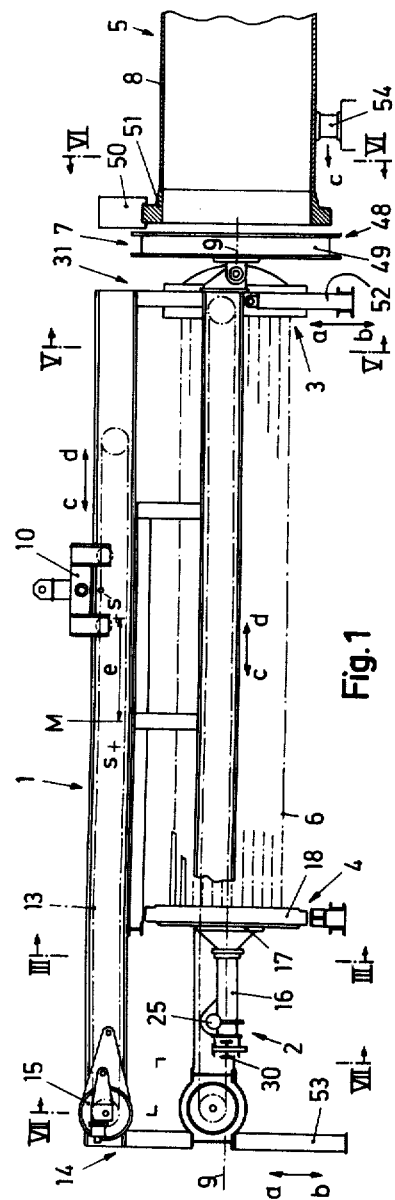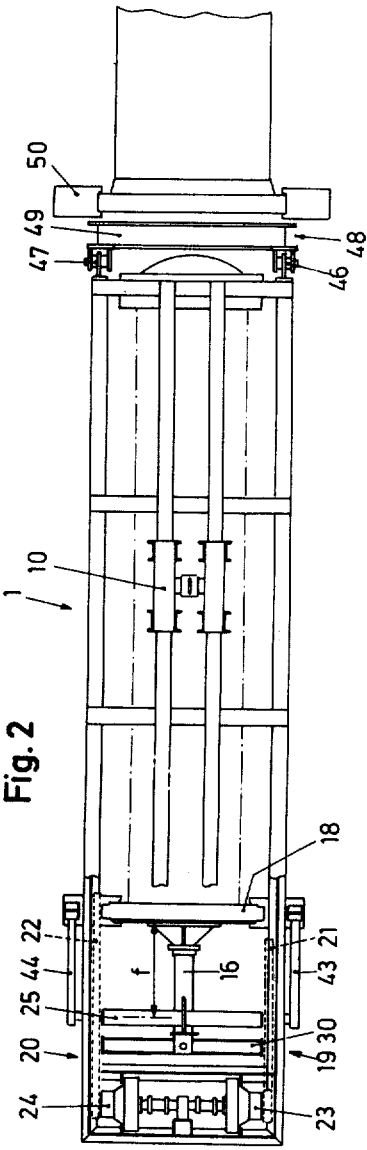

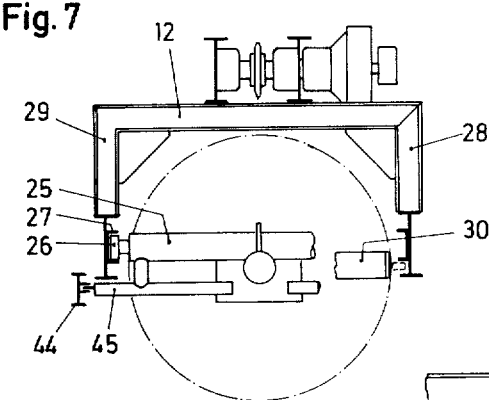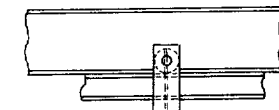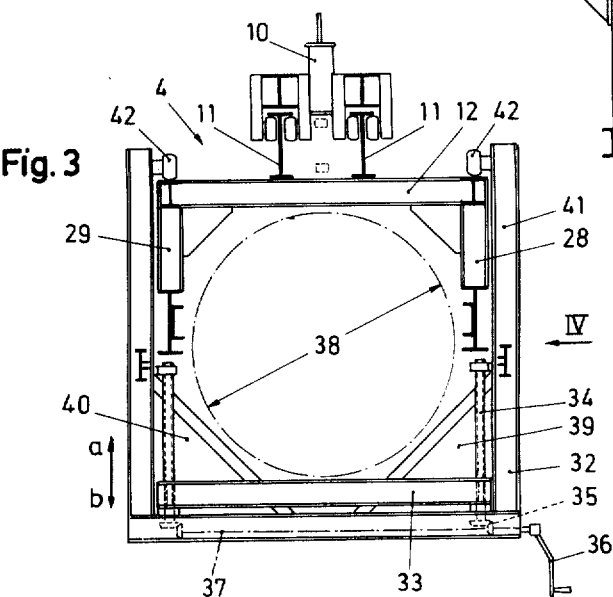

APPARATUS FOR PULLING AND REPLACING HEAT EXCHANGE TUBING

The present invention relates to apparatus for withdrawing from heat exchange shells the bundles of heat exchange tubes therein.

In various processes in which fluids are heat exchanged against each other by the use of tubular heat exchangers, it is necessary from time to time to remove the tube bundle from the shell for cleaning, replacement or repair. As the bundles are heavy and cumbersome, they are lifted by means of a crane, a forklift or a winch. This operation as heretofore practiced, however, has been quite expensive and time consuming, especially in the case where a plurality of heat exchangers may be installed in a framework having a height of up to 100 feet.

Accordingly, it is an object of the present invention to provide apparatus for removing bundles of heat exchange tubing from the shells of heat exchangers, and for reintroducing such tubing into the shells, which avoids the imposition of undesirable horizontal forces on various parts of the heat exchanger.

Another object of the present invention is the provision of such apparatus, which supports the tubing at all stages of removal from the shell.

Finally, it is an object of the present invention to provide such apparatus, which will be relatively simple and inexpensive to manufacture, easy to install, maintain, operate and repair, and rugged and durable in use.

Briefly, the objects of the present invention are achieved by providing such apparatus comprising a support frame having hingedly connected thereto an abutment frame that contacts the flange of the heat exchange shell and so transmits the reactive forces uniformly to that shell and not to the base of the heat exchanger. The apparatus also comprises means that can be secured to the tube sheet and power means for horizontally reciprocating the same to move the tube bundle horizontally. A support with a vertically movable cradle is disposed in fixed horizontal position at the end of the frame adjacent the heat exchanger; while remote from the heat exchanger, a support and cradle are mounted for conjoint horizontal movement in supporting relationship to the emergent end of the tube bundle. A trolley movable horizontally lengthwise of the frame provides single point support for the frame so that the frame with or without a supported tube bundle can be moved in balanced relationship by a crane. The movement of the trolley along the frame makes it possible to balance the frame regardless of whether the frame supports an unbalanced load of heat exchange tubes.

Other objects, features and advantages of the present invention will become apparent from a consideration of the following description, taken in connection with the accompanying drawings, in which:

FIG. 1 is a side elevational view, with parts broken away for clarity, of apparatus according to the present invention;

FIG. 2 is a plan view of FIG. 1;

FIG. 3 is a cross-sectional view on the line III—III of FIG. 1;

FIG. 4 is a fragmentary view in the direction of the arrow IV of FIG. 3;

FIG. 7 is a section along the line VII—VII of FIG. 1.

Figure 5:
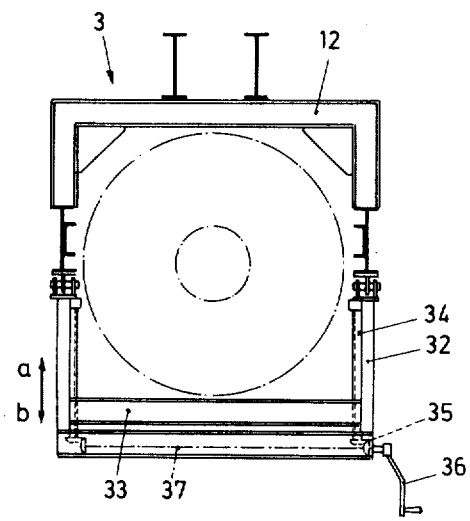
FIG. 5 is a section along the line V—V of FIG. 1.

Referring now to the drawings in greater detail, there is shown apparatus according to the present invention, comprising a frame 1 supporting thereon a motor-driven horizontally pushing and pulling device 2. A support 3 (see FIG. 5) is fixedly secured to the end of frame 1 adjacent the exchanger to be acted upon; while a support 4 (FIG. 3) is horizontally movable on and relative to frame 1.

The heat exchanger 5 whose tube bundle 6 is to be removed, is shown in FIG. 1. An abutment frame 7 is designed to abut endwise against the shell 8 of exchanger 5 and is pivotally mounted for vertical swinging movement about a horizontal axis perpendicular to the common horizontal axis of frame 1 and shell 8.

A carriage 10 rolls on rails 11 that extend lengthwise of frame 1 and are fixedly secured to the upper cross pieces 12 of frame 1. An endless chain 13 causes trolley 10 to traverse along the length of frame 1; while at the end 14 of frame 1 from exchanger 5, an air motor 15 causes chain 13 to circulate. Trolley 10 can thus be moved lengthwise of frame 1 to overlie the center of center of gravity of frame 1 regardless of whether frame 1 is loaded or not, so that a crane (not shown) can pick up the entire assembly by means of trolley 10 for transportation to another site.

A carriage 16 carries at its end facing the heat exchanger a plate 17 which can be removably secured as by bolting or screwing to a tube sheet 18 of bundle 6. Carriage 16 is reciprocable longitudinally of frame 1 between the two longitudinal sides 19 and 20 thereof, by two endless driving chains 20, 21 that are circulated by compressed air motors 23, 24 carried by frame 1. To this end, carriage 16 is suspended from a crosspiece 25 that carries rollers 26 that ride on guide rails 27 of a subframe 28, 29 of frame 1. The chains 21, 22 are attached to a transverse member 30 carried by carriage 16.

Support 3 is on the end 31 of frame 1; while support 4 comprises a U-shaped frame 32 that supports a horizontal cradle 33 that is carried at its ends by upright screw-threaded spindles 34. Miter gearing 35 rotated by a crank handle 36 and a spindle 37, raises and lowers cradle 33 to support bundles 6 of different diameters 38. Oblique plates 39, 40 carried by frame 32 assist in centering the tube bundles.

Frame 32 also comprises uprights 41 that carry at their upper ends inwardly directed rollers 42 that roll on crosspiece 12 of frame 1 lengthwise of frame 1. Lateral traction rails 43, 44 (FIG. 2) support a towing crosspiece 45 (FIG. 7) which is attached to crosspiece 25 of carriage 16. The distance $f$ between uprights 41 and member 45 is fixed by rails 43, 44.

Figure 6:
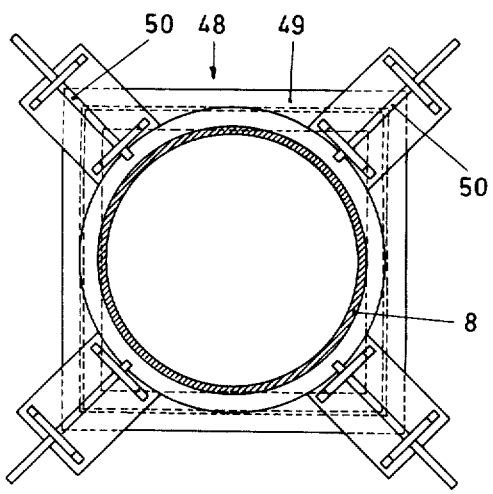
FIG. 6 is a section along the line VI—VI of FIG. 1.

At the other end 31 of frame 1, adjacent exchanger 5, the abutment frame 7 is seen to carry a fastening device 48 connected to frame 1 by joints 46, 47 (FIG. 2) including a frame 49 (FIG. 6) on whose periphery are arranged four clamps 50 for clamping a flange 51 on shell 8 of heat exchanger 5.

Frame 1 rests at its opposite ends on feet 52, 53, and means (not shown) are provided for vertically adjusting the height of frame 1 and hence the position of its horizontal axis 9, in the direction of the arrows $a$, $b$ in FIG. 1.

In operation, frame 1 is moved by a crane (not shown), suspended from trolley 10 with trolley 10 above the center of gravity of empty frame 1, into the position shown in FIG. 1 adjacent the heat exchanger 5.

Flange 51 of the heat exchanger is clamped by clamps 50, in which clamped position the axes of the frame and the heat exchanger shell are coincident. Carriage 16 is then displaced in the direction of the arrow *d* and plate 17 is clamped by bolting or screwing to tube sheet 18. Releaseable clamps (not shown) can be provided between rails 43, 44 and crosspiece 45 which are of course released to permit movement of carriage 16.

Then carriage 16 is displaced in the direction of the arrow c in FIG. 1, whereupon tube bundle 6 is pulled from shell 8 of exchanger 5.

After tube sheet 18 has emerged from exchanger 5, movable support 4 can be located thereunder and cradle 33 raised to support the lower edge of sheet 18. Thereafter, support 4 moves to the left as seen in FIG. 1, with the emerging tube bundle. When the tube bundle has fully emerged, then the tube sheet at the other end of the bundle can be supported by the cradle 33 of support 3. If rails 43 and 44 can be releaseably secured to crosspiece 45, then this is done so as to fix the position of the tube bundle relative to frame 1.

It will of course be appreciated that the transfer of support of the tube bundle 6 from exchanger 5 to frame 1 causes the center of gravity of the frame 1 to move from the vertical plane M of FIG. 1, first to the right to S', and then as the bundle emerges to the left to S, the planes M and S' being separated by a distance e. Therefore, to move the loaded frame 1, the trolley 10 should be positioned to be bisected by the vertical plane S. In that position of the parts, the clamps 50 are released from the flange 51 and a crane (not shown) can raise the loaded frame 1 by the trolley 10 for removal of the tube bundle to the location in which an operation such as cleaning, replacement or repair can be performed on it.

It will of course be understood that the reinsertion of tube bundle 6 into heat exchanger 5 is effected by the opposite sequence of steps.

It will also be understood that the clamping of frame 7 to shell 8 causes the reaction forces of the pulling of the tube bundle to be absorbed in compression lengthwise of shell 8 and be well distributed about the periphery of shell 8.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for the placement and removal of a tube bundle of a heat exchanger, comprising a first frame, means carried by said first frame for pulling or inserting a tube bundle from or into the shell of said heat exchanger in a horizontal direction, means carried by the first frame for supporting opposite ends of a said tube bundle, a second frame pivotally secured to said first frame, means for releasably securing said pivotable frame to one end of the shell of a said heat exchanger, means to suspend said first frame from a lifting device, and means mounting said suspending means for movement relative to the first frame over most of the length of said first frame in said horizontal direction for continuously adjusting said means to suspend said first frame according to the change of center of gravity of the overall apparatus and the part of said tube bundle supported thereby when said tube bundle is being removed from, or inserted into, said shell of a heat exchanger.

2. Apparatus as claimed in claim 1, said suspending means comprising a trolley running on rails mounted on said first frame in said horizontal direction, and power means for moving said trolley along said rails.

3. Apparatus as claimed in claim 2, said power means comprising an endless drive member secured to said trolley, said power means comprising a motor mounted on said first frame for circulating said endless drive member.

* * * * *